United States Patent
Nammi et al.

(10) Patent No.: US 10,433,249 B2
(45) Date of Patent: *Oct. 1, 2019

(54) METHOD, SYSTEM AND DEVICE FOR SWITCHING A TRANSMISSION TIME INTERVAL

(71) Applicant: Telefonaktiebolaget LM Ericsson (publ), Stockholm (SE)

(72) Inventors: Sairamesh Nammi, Kista (SE); Mark Curran, County Carlow (IE); Cagatay Konuskan, Oslo (NO); Gerardo Agni Medina Acosta, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,916

(22) Filed: Jan. 30, 2018

(65) Prior Publication Data

US 2018/0152887 A1    May 31, 2018

Related U.S. Application Data

(63) Continuation of application No. 14/430,118, filed as application No. PCT/EP2014/078724 on Dec. 19, 2014, now Pat. No. 9,894,606.
(Continued)

(51) Int. Cl.
*H04W 4/00* (2018.01)
*H04W 52/02* (2009.01)
(Continued)

(52) U.S. Cl.
CPC ..... *H04W 52/0216* (2013.01); *H04W 52/365* (2013.01); *H04W 56/001* (2013.01);
(Continued)

(58) Field of Classification Search
CPC .......... H04W 52/0216; H04W 56/001; H04W 72/0433; H04W 72/0446; H04W 72/082
See application file for complete search history.

(56) References Cited

U.S. PATENT DOCUMENTS

| | | | |
|---|---|---|---|
| 2001/0014113 A1* | 8/2001 | Imura | H04J 13/12 375/141 |
| 2006/0176869 A1 | 8/2006 | Cheng et al. | |

(Continued)

FOREIGN PATENT DOCUMENTS

| | | |
|---|---|---|
| EP | 2034757 A1 | 3/2009 |
| EP | 2426986 A1 | 3/2012 |
| GB | 2495473 A | 4/2013 |

OTHER PUBLICATIONS

Unknown, Author, "2ms/10ms TTI Switching", 3GPP TSG-RAN WG2#46, R2-050566, Lucent Technologies, Scottsdale, Arizona, USA, Feb. 14-18, 2005, pp. 1-3.

*Primary Examiner* — Abdelnabi O Musa
(74) *Attorney, Agent, or Firm* — Murphy, Bilak & Homiller, PLLC

(57) ABSTRACT

A method and system for synchronized switching of a Transmission Time Interval (TTI) between at least two different TTI length values. A UE 100 transmitting a power report, where a control node 150 or a Base Station 110A evaluates the report and decides, based on the evaluation to order the UE to switch to a different TTI length. The order message comprises the number of TTIs after which a TTI switch has to occur, composed a.o. based on radio environment condition. The UE receives a TTI switch order message and replies with a single message to its serving BS with a message to switch the TTI in a synchronous way.

16 Claims, 5 Drawing Sheets

Related U.S. Application Data

(60) Provisional application No. 61/968,417, filed on Mar. 21, 2014.

(51) Int. Cl.
  *H04W 72/04* (2009.01)
  *H04W 56/00* (2009.01)
  *H04W 72/08* (2009.01)
  *H04W 52/36* (2009.01)

(52) U.S. Cl.
  CPC ... *H04W 72/0433* (2013.01); *H04W 72/0446* (2013.01); *H04W 72/082* (2013.01); *Y02D 70/00* (2018.01); *Y02D 70/1242* (2018.01); *Y02D 70/1262* (2018.01); *Y02D 70/24* (2018.01)

(56) References Cited

U.S. PATENT DOCUMENTS

| | | | |
|---|---|---|---|
| 2012/0039294 A1* | 2/2012 | Yan | H04W 36/06 370/329 |
| 2012/0140689 A1* | 6/2012 | Pelletier | H04L 5/0005 370/311 |
| 2013/0010704 A1 | 1/2013 | Kronquist et al. | |
| 2014/0016595 A1 | 1/2014 | Kubota et al. | |
| 2014/0112127 A1* | 4/2014 | Jayaram | H04W 24/08 370/230 |
| 2014/0241329 A1 | 8/2014 | Lin et al. | |

* cited by examiner

METHOD, SYSTEM AND DEVICE FOR SWITCHING A TRANSMISSION TIME INTERVAL

TECHNICAL FIELD

The present invention relates generally to a method, system and device to enable synchronized switching between different transmission time intervals in a wireless communication system.

BACKGROUND

In a typical cellular network, also referred to as a wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the radio access network and possibly one or more core networks, comprised within the cellular network.

The cellular network covers a geographical area which is divided into cell areas. Each cell area is served by a Base Station, BS, or Radio Base Station (RBS), which sometimes may be referred to as e.g. "eNB", "eNodeB", "NodeB", "B node", or BTS (Base Transceiver Station), depending on the technology and terminology used.

The base stations may be of different classes such as e.g. macro eNodeB, home eNodeB or pica base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation (3G) mobile communication system, which evolved from the second generation (2G) mobile communication system (GSM) and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, a base station or radio base station as described above will be referred to as a Base Station (BS). A user equipment as described above, will in this disclosure be referred to as a User Equipment or a UE.

The expression Downlink (DL) will be used for the transmission path from the base station to the user equipment. The expression UpLink (UL) will be used for the transmission path in the opposite direction i.e. from the user equipment to the base station.

Cellular communication networks evolve towards higher data rates, together with improved capacity and coverage. In 3GPP, standardization body technologies like GSM, HSPA and LTE have been and are currently developed.

To provide for mobility in the cellular network, the cellular network must perform so called handovers when the user equipment moves from one cell to another. A handover means that there is a change of serving cell for the user equipment from a so-called source cell to a so-called target cell. There are mechanisms in the cellular network to identify which cells are candidate target cells for handover. Typically, the user equipment regularly performs measurements to monitor which cells provide coverage at its current location. The measurement result is sent to a serving base station of the source cell in so called measurement reports. These measurement reports may be used to trigger a handover to the target cell in due time before the user equipment moves out of coverage from the source cell.

Apart from handovers, measurements are also made by the UE to enable a base station or control node to decide on the length of the Transmission Time Interval (TTI) to be deployed. The length of the TTI influences the performance of the radio communication between UE and BS. A relatively long TTI length has the advantages of being efficient in error correction and consuming relatively low power, while a relatively short TTI length has the advantages of providing higher data rates and enabling faster adaptation to a changing radio environment.

When a UE is close to the center of the serving cell, so in general close or in short range to the serving BS antenna, a relatively short TTI is applied. When however the UE is moving away from the center of the served cell, the disadvantage occurs that due to the distance the power required to maintain the BS-UE radio link has to be increased. Increasing power has a disadvantageous effect to other UEs in the same cell and should be limited in order to maintain the radio links between the other UEs and the BS. When reaching this limit, an alternative can be applied to maintain said BS-UE radio link in deploying a lower power scheme by switching to a longer TTI.

The actual deployment of either the shorter or longer TTI length is a tradeoff between a.o. the parameters listed above For supporting mobile broadband services, good latency is essential in providing good end-user experience. This requires short round-trip time enabled by relatively short TTI.

For the Enhanced UpLink, EUL, the value used for a short TTI is therefore preferred over the long TTI. In current 3G networks, there is still a substantial amount of large macro cells where supporting the short TTI in the entire cell may be a challenge. In such environments, it may be necessary to apply to the long TTI for a UE residing at the cell boundary.

A problem is that, the BS and the UE should switch to a different TTI, listed as a TTI switching process, at the same instant, and it is regarded that this is a process of that takes time and takes power, e.g power from the battery fed UE, causing the TTI switching process reducing available lifetime of the operational up-time of the UE.

Another problem is that the TTI switching process requires signaling that is applied via the radio environment, thereby competing with, or at least influencing or interfering, other UEs for radio links with the BS, and can be disadvantageously influenced by changing radio environment conditions, which may result in an unsatisfactory HI switching process. Failed transmissions of data after an unsatifying TTI switch may occur.

SUMMARY

In view of the discussion above, it is an object for embodiments herein to provide an improved and robust way of performing TTI switching in a cellular network.

In particular, it is an object for embodiments to increase the chances to correctly perform a switching procedure.

In an aspect of the invention a method for synchronized switching of a Transmission Time Interval, TTI, between at least two different TTI length values is proposed, wherein the method is performed by a number of steps described below.

In a first step a User Equipment (UE) transmits a report comprising a measured received power by the UE.

In a second step a Base Station (BS) being the serving BS for the UE, receives the report, and forwards the report to a Control Node.

In a further step the Control Node receives the report, evaluates the report and decides, based on the evaluation, to order the UE to initialize a switching of an actual length value to a different TTI length value, by transmitting a switching message, the switching message comprising a first identifier identifying the different TTI length value.

In a still further step the BS receives the switching message, and for a des the switching message to the UE.

In a still further step the UE transmits a single reply message in response to receiving the switching message, for acknowledging reception of the switching message and initializes a synchronized switching to the different TTI length value identified by the first identifier.

In a further aspect of the invention a method in a User Equipment UE, for synchronized switching of a Transmission Time Interval (TTI) between at least two different TTI length values, the UE deploying an actual TTI length value, is proposed, wherein the method is performed by a number of steps described below.

In a first step the UE receives a switching message comprising a first identifier identifying a different TTI length value.

In a second step the UE transmits a single reply message in response to the switching message, for acknowledging reception of the switching message and initializing a synchronized switching to the different TTI length value identified by the first identifier.

In a still further aspect of the invention a method in a Base Station, BS, for synchronized switching of a Transmission Time Interval, TTI, between at least two different TTI length values, is proposed wherein the BS deploys an actual TTI length value, and wherein the method is performed by a number of steps described below.

In a first step the BS receives a report comprising a measured received power by a User Equipment, UE, and forwards the report.

In a second step the BS, receiving a switching message in response to the forwarded report, and forwards the switching message, wherein the switching message comprises a first identifier identifying a different TTI length value.

In a further step the BS receives a single reply message in response to transmitting the switching message, for acknowledging reception of the switching message and initializing a synchronized switching to the different TTI length value identified by the first identifier.

In a still further step the BS holds transmission of messages for a number of TTIs, and in a still further step the BS commences transmission of messages deploying the different TTI length value.

In a still further aspect of the invention a method in a Base Station, BS, for synchronized switching of a Transmission Time Interval, TTI, between at least two different TTI length values, is proposed wherein the BS deploys an actual TTI length value, and wherein the method is performed by a number of steps described below.

In a first step the BS receives a report comprising a measured received power by a User Equipment, UE.

In a second step the BS evaluates the report and decides, based on the evaluation, to order the UE to initialize a switching of an actual TTI length value to a different TTI length value, by transmission of a switching message, wherein the switching message comprises a first identifier identifying a different TTI length value.

In a further step the BS receives a single reply message in response to the transmission of the switching message, for acknowledging reception of the switching message and initializing a synchronized switching to the different TTI length value identified by the first identifier.

In a still further step the BS holds its transmission of messages for a number of TTIs and, In a still further step the BS commences the transmission of messages deploying e different TTI length value.

In a still further aspect of the invention a system in for synchronized switching of a Transmission Time Interval, TTI, between at least two different TTI length values, is proposed, wherein the system comprises at least one User Equipment, UE, at least one Base Station, BS, and a Control Node.

The UE of the system is arranged to transmit a report comprising a measured received power by the UE;

The BS comprised by the system, being the serving BS of UE, is arranged to receive the report, and forward the report to the Control Node.

The Control Node comprised by the system is arranged to receive the report, evaluate the report and decide, based on the evaluation, to order the UE to initialize a switch of an actual TTI length value to a different TTI length value, wherein the control node is further arranged to transmit a switching message, wherein the switching message comprises a first identifier identifying a different TTI length value.

The BS is further arranged to receive the switching message, and to forward the switching message.

The UE is further arranged to transmit a single reply message in response to the reception of the switching message, for an acknowledgement of reception of the switching message, and to initialize a synchronized switching to the different TTI length value identified by the first identifier.

In a still further aspect of the invention a User Equipment, UE, for synchronized switching of a Transmission Time Interval, TTI, between at least two different TTI length values, is proposed wherein the UE is arranged to deploy an actual- and a different-TTI length value.

The UE comprises a processing unit arranged to process program instructions.

The UE further comprises a memory arranged to store the program instructions and network parameters The UE still further comprises an interface arranged to connect to other entities, and wherein the processing unit is further arranged, under the program instructions, to control the interface, in that a switching message comprising a first identifier identifying the different TTI length value is received and stored in the memory.

The processing unit comprised by the UE is further arranged, under the program instructions to compile a single reply message in response to the switching message, as to acknowledge reception of the switching message and as to initialize a synchronized switching to the different TTI length value identified by the first identifier.

The processing unit comprised by the UE is still further arranged, under the program instructions, to control the interface to transmit the compiled single reply message.

In a still further aspect of the invention a Base Station, BS, for synchronized switching of a Transmission Time Interval, TTI, between at least two different TTI length values, is proposed wherein the BS is arranged to deploy an actual- and a different-TTI length value.

The BS comprises a processing unit arranged to process program instructions.

The BS further comprises a memory arranged to store the program instructions and network parameters.

The BS still comprising an interface arranged to connect to other entities, and wherein the processing unit is further arranged, under the program instructions, to control the interface, in that a report message is received, and wherein the report message comprises a report comprising a measured received power by a User Equipment, UE, which is forwarded.

The processing unit comprised by the BS, is further arranged, under the program instructions, to control the interface, in that a switching message is received in response to the forwarded report.

The processing unit comprised by the BS, is still further arranged, under the program instructions, to control the interface by forwarding the switching message, wherein the switching message comprises a first identifier identifying the different TTI length value.

The processing unit comprised by the BS is still further arranged, under the program instructions, to control the interface, in that a single reply message is received and forwarded, wherein the single reply message is interpreted by the processing unit as an acknowledge to the switching message transmission and the single reply message interpreted by the processor as an initiation to hold transmissions with respect to the UE.

In a still further aspect of the invention a Base Station, BS, for synchronized switching of a Transmission Time Interval, TTI, between at least two different TTI length values, is proposed, wherein the BS is arranged to deploy an actual- and a different-TTI length value.

The BS comprises a processing unit arranged to process program instructions;

The BS further comprises a memory arranged to store the program instructions and network parameters;

The BS still further comprises an interface arranged to connect to other entities, and wherein the processing unit is further arranged, under the program instructions, to control the interface, in that a report message is received, wherein the report message comprises a report comprising a measured received power by a User Equipment, UE.

The processing unit comprised by the BS is still further arranged, under the program instructions, to evaluate the report and to deciding, based on the evaluation, to order the UE to initialize a switching of an actual TTI length value to a different TTI length value, and to transmit a switching message, wherein the switching message comprises a first identifier identifying the different TTI length value.

The processing unit comprised by the BS is still further arranged, under the program instructions, to control the interface, in that a single reply message is received and forwarded, wherein the single reply message is interpreted by the processing unit as an acknowledge to the switching message transmission and wherein the single reply message is interpreted by the processor as an initiation to hold transmissions with respect to the UE.

In a still further aspect of the invention a computer program is proposed, which, when being executed by a processing unit in a User Equipment, UE, is adapted to carry out or control a method for synchronized switching of a Transmission Time Interval, TTI, between at least two different TTI length values, wherein the UE is further adapted to deploy an actual- and a different-TTI length value, and wherein the computer program performs the steps listed below.

As a first step the UE receives a switching message comprising a first identifier identifying the different TTI length value.

As a second step the UE transmits a single reply message in response to the switching message, for acknowledging the reception of the switching message and initializes a synchronized switching to the different length value identified by the first identifier.

In a still further aspect of the invention a computer program is proposed which, when being executed by a processing unit in a Base Station, BS, is adapted to carry out or control a method for synchronized switching of a Transmission Time Interval, TTI, between at least two different TTI length values, the BS further adapted to deploy an actual- and a different-TTI length value, and wherein the computer program performs the steps listed below As a first step the BS receives a report comprising a measured received power by a User Equipment, UE, and wherein the report is forwarded.

As a second step the BS receives a switching message in response to the forwarded report, and wherein the switching message is forwarded, wherein the switching message comprising a first identifier identifying a different TTI length value.

As a further step the BS receives a single reply message in response to the transmission of the switching message, for acknowledging reception of the switching message and initializing a synchronized switching to the different TTI length value identified by the first identifier.

As a still further step the BS holds the transmission of messages for a number of TTIs.

As a still further step the BS commences transmission of messages that deploy the different TTI length value.

In a still further aspect of the invention a computer program is proposed, which, when being executed by a processing unit in a Base Station, BS, is adapted to carry out or control a method for synchronized switching of a Transmission Time Interval, TTI, between at least two different TTI length values, the BS further adapted to deploy an actual- and a different-TTI length value, and wherein the computer program performs the steps listed below.

As a first step the BS receives a report comprising a measured received power by a User Equipment, UE.

As a second step the BS evaluates the report and decides, based on the evaluation, to order the UE to initialize a switching of an actual TTI length value to a different TTI length value, by transmission of a switching message, wherein the switching message comprises a first identifier identifying a different TTI length value.

As a further step the BS receives a single reply message in response to the transmission of the switching message, for acknowledging reception of the switching message and initializing a synchronized switching to the different TTI length value identified by the first identifier.

As a still further step the BS holds the transmission of messages for a number of TTIs.

As a still further step the BS commences the transmission of messages deploying the different TTI length value.

In a still further aspect of the invention an apparatus for synchronized switching of a Transmission Time Interval, TTI, between at least two different Tri length values, is proposed wherein the apparatus is arranged to deploy an actual- and a different-TTI length value.

The apparatus comprises an Input/Output, I/O, module for receiving a switching message. The switching message comprises a first identifier identifying the different TTI length value and a second identifier identifying a number of TTIs after which a switching of a current TTI length value to the different TTI length value has to occur.

The apparatus further comprises a storage module for storing the first and the second identifier the I/O module comprised by the apparatus additionally applied for transmitting a single reply message in response to the switching message, as to acknowledge reception of the switching message and as to initialize a synchronized switching to the different TTI length value identified by the first identifier.

The apparatus still further comprising a counter module to start counting the number of TTIs on transmission of the single reply message the number of TTIs until the value indicated by the second identifier.

The apparatus still further comprising a hold transmission module to hold transmission of messages via the I/O module during counting of the counter module.

These and other embodiments according to the present invention are now illustrated in more detail with reference to the enclosed drawings.

DETAILED DESCRIPTION

Figure 1:
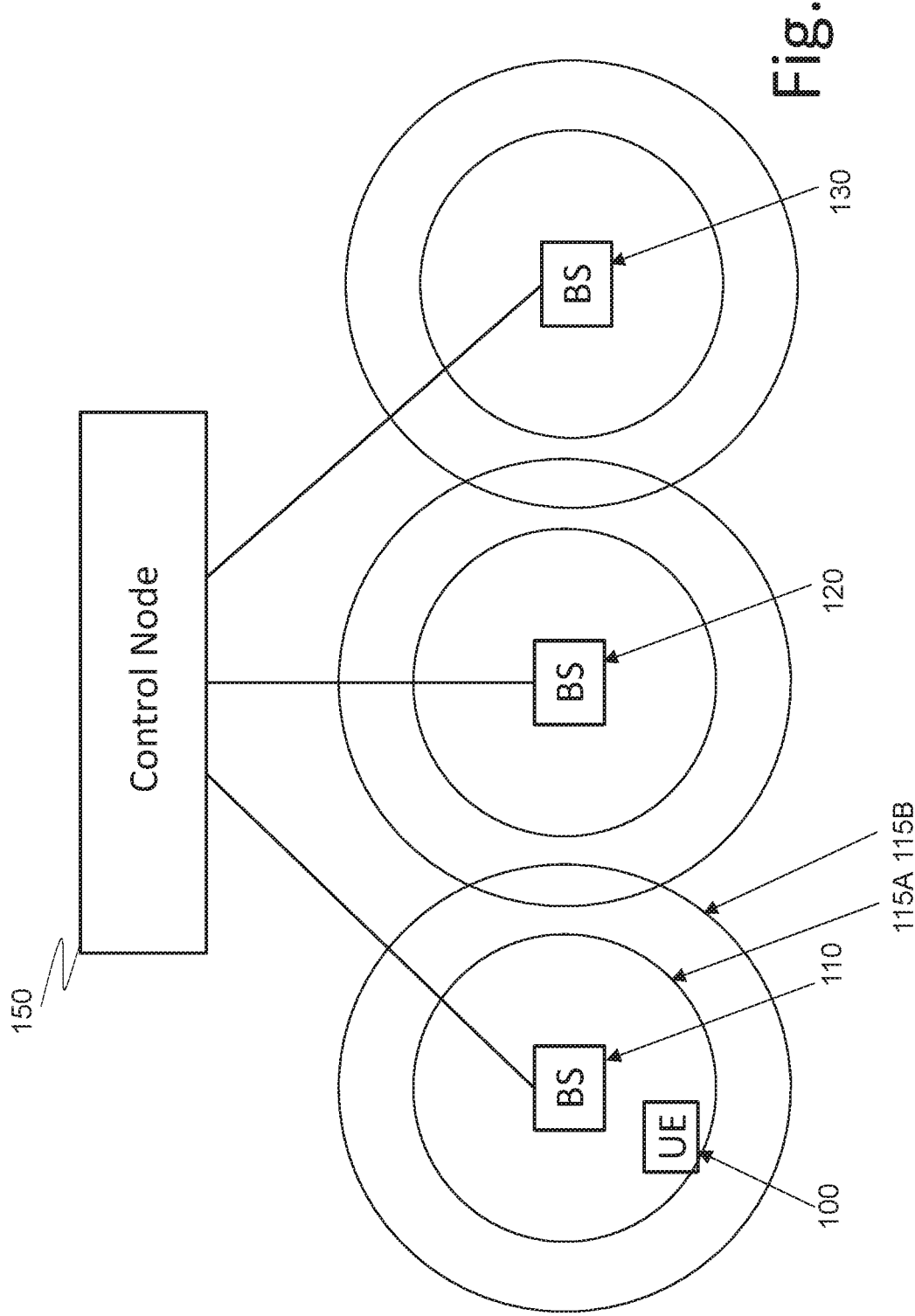
FIG. 1 is a block diagram illustrating an embodiment of a system.

FIG. 1 is a block diagram illustrating an embodiment of a system.

FIG. 1 shows an arbitrary number of three Base Stations (BS), 110, 120, 130, each having a coverage area, also known as cell. The coverage area of BS 110 is referenced 115B. The other BSs 120, 130 have identical coverage areas. A BS might be as an example a Base Transceiver Station, BTS, Node B or enhanced Node-B, eNode-B As illustrated above there is a region in the BS coverage area where a relatively short Transmission Time Interval, TTI, referenced as short TTI, is applied and a region where a relatively long TTI referenced as long TTI, is applied.

For BS 110 the area comprised by circle 115A is illustratively designating the area applying a short TTI and the area between circles 115A and circle 115B is illustratively designated the area for applying the long TTI. The other BS 120 and 130 have identical areas within the coverage area.

The BS 110 is the serving BS for User Equipment (UE) 100, residing in the coverage area 115E of BS 110. The BS 120 and 130 are referenced as non-serving BS, but are potential serving BSs if UE 100 moves to their respective coverage areas.

The BSs 110, 120, 130 are linked to a control node 150, which might be as an example a Base Station Controller, BSC, a Radio Network Controller, RNC. The links enable communication between the BSs and the Control Node 150 wherein the Control Node is enabled to forward messages between the BSs.

The switching procedure needs to be synchronized in order for the UE and the network to know when the TTI switching takes place. As in any synchronized procedure, there is a risk associated with the execution, in particular in situations where coverage is an issue.

Figure 2:
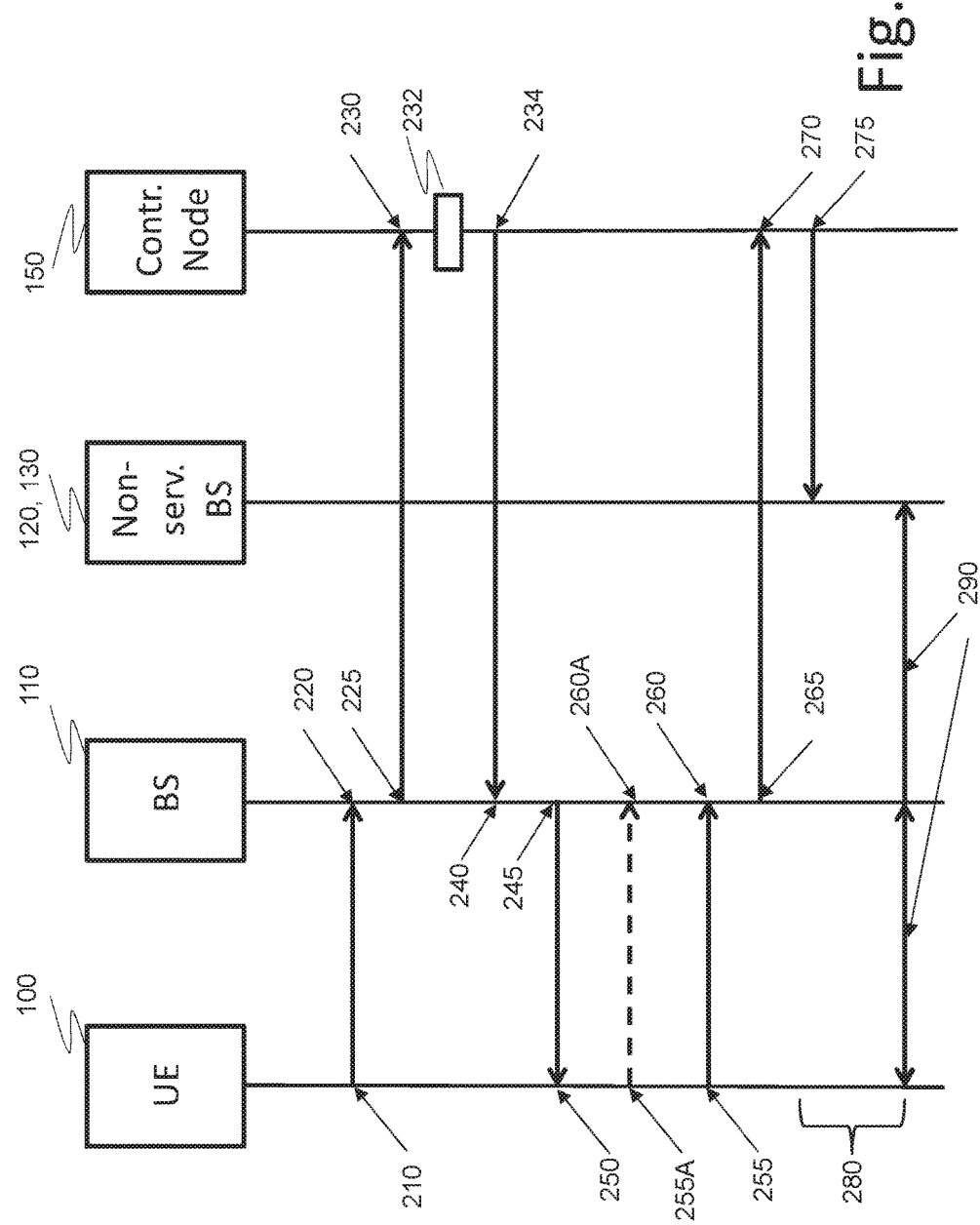
FIG. 2 is a signaling diagram illustrating an embodiment of method steps.

FIG. 2 is a signaling diagram illustrating an embodiment of method steps.

FIG. 2 presents the signaling between the UE 100, the serving BS 110, the non-serving BS 120, 130 and the Control Node 150. FIG. 2 represents an embodiment wherein the control node 150 decides on a TTI switch.

It is to be understood that a number of network parameters, such as applicable TTI value lengths, an applicable number of TTIs after which a switching of the actual TTI length value to a different TTI length than the actual TTI length, has to occur, are exchanged in an initial stage between UE 100, BS 110, 120, 130 and optionally the Control Node, such that an indicator can be applied in messages, referring to the predetermined exchanged parameter. As an example, the short TTI and long TTI length are already exchanged as 2 ms and 10 ms and stored in UE 100 and BSs 110, 120, 130.

The UE 100, transmits 210 a report comprising a measured received power by the UE 100. This report is e.g a filtered Uplink Power Headroom, UPH, 18-bit Protocol Data Unit (PDU) message. The report is transmitted periodically, when the UE is triggered by changing radio environment conditions or when the serving BS requests for a report.

The serving BS 110, receives 220 the report, and forwards 225 the report to the Control Node 150.

The Control Node 150 receives 230 the report and evaluates 232 the report.

the TTI switching decision is based in an evaluation of a Media Access Control (MAC) Uplink Power Headroom (UPH) report transmitted by the UE. The values of the short TTI 2 ms and the long TTI 10 ms TTI length are preconfigured in the UE and the BS.

The UE sends an 18-bit UPH report to the serving BS when triggering criteria are met or periodically.

Both the UE and the BS will switch to a different TTI length, a predefined number of TTIs after the completion of the synchronized reconfiguration.

The Control Node 150 decides, based on the evaluation, to order the UE 100 to initialize a switching of an actual TTI length value to a different TTI length value, by transmitting 234 a switching message, the switching message comprising a first identifier identifying the different TTI length value. The synchronized reconfiguration of BS and UE, is achieved by using a High Speed Shared Control Channel, HS-SCCH order message, followed by a L1 acknowledge, ACK in response to the HS-SCCH order message.

The TTI switch is, depending on the actual TTI length a switch to another TTI length. In case there are only two TTI lengths are predefined, a toggle between both is applicable. In case more than two TTI lengths are predefined the first identifier identifies which one TTI length. As an example, 2 ms and 10 ms TTI length are listed although as an example a range of values such as 0.1, 0.2, 0.4, 0.5, 0.8, 1, 1.2, 1.5 ms for the short TTI and 1, 2, 4, 6, 8, 10 ms for the long TTI are applicable as long as there is a difference between both TTIs.

The Control Node 150 is, apart from deciding whether a TTI switch has to occur, also decisive in the number of TTI which has to be deployed after when a TTI switch occurs. E.g. the actual radio environment conditions influence the selected TTI number value.

The serving BS 110 receives 240 the switching message, and forwards 245 the switching message to the UE 100. The switching message 245 is a message such as a High Speed— Shared Control Channel HS-SCCH message.

The UE 100 transmits 255 a single reply message in response to receiving 250 the switching message, for acknowledging reception of the switching message and initializing a synchronized switching to the different TTI length value identified by the first identifier. The single reply message is a TTI switch commit message e.g. a High Speed Dedicated Physical Control Channel (HS-DPCCH) message as an 18 bit Protocol Data Unit (PDU) message.

The serving BS 110, forwards 265 the single reply message to the Control Node 150, as to enable other BSs, e.g. the non-serving BS 120, 130, to also be aware that the Tri for UE 100 has changed. The single reply message sent by the serving BS 110 is a TTI length update message.

The Control Node 150 receives 270 the single reply message and in response transmits 275 a second message to non serving Base Stations 120, 130 for synchronized switching to the different TTI length value identified by the first identifier, the second message additionally comprising a second identifier identifying a number of TTIs after which a switching of the actual TTI length value to the different TTI length has to occur. The single reply message comprises also the indicator indicating the different TTI length value, such that when the transmission from the serving BS 110 via the Control Node 150 towards the non-serving BSs 120, 130, takes longer than the TTI switching procedure, due to network latency, are still aware of the different TTI length value of the UE 100. The second message transmitted 275 by the Control node is a TTI length update message.

The UE 100 holds 280 transmission of messages for a number of TTIs equal to the number of TTIs identified by the second identifier and the serving BS 110 receiving 260 the single reply message holds transmission of messages in relation to the UE 100 for a number of TTIs equal or in relation to the number of TTIs identified by the second identifier.

The UE 100 and the serving BS 110 commence 290 transmissions of messages deploying the different TTI length value.

Depending on the configuration of the serving BS 110 and UE 100, the number of TTIs identified by the second identifier is decreased by e.g. a configurable fixed value of 0, 1, 2 or 3, as to enable the serving BS 110 to synchronize the TTI switch initialised by the UE 100, between the UE 100 and the serving BS 110.

Optionally the UE 100 transmits a reply Acknowledge message 255A in response to receiving 250 of the switching order message, replacing the acknowledgement in the single reply message. The serving BS 110 receives 260A the Acknowledge and starts waiting for the single reply message 260 as to initiate the TTI switching.

In case of a potential Soft Handover, i.e. a UE in idle mode changing a serving cell, in order to ensure that both serving and non-serving BSs perform a TTI switch simultaneously, the UE sends a L1 or MAC indication after receiving the HS-SCCH order before the actual switch. Alternatively, the serving BS informs the Control Node of the TTI length update and the Control Node forwards the information to all the BSs in order to guarantee the alignment among serving and non-serving BS.

Figure 3:
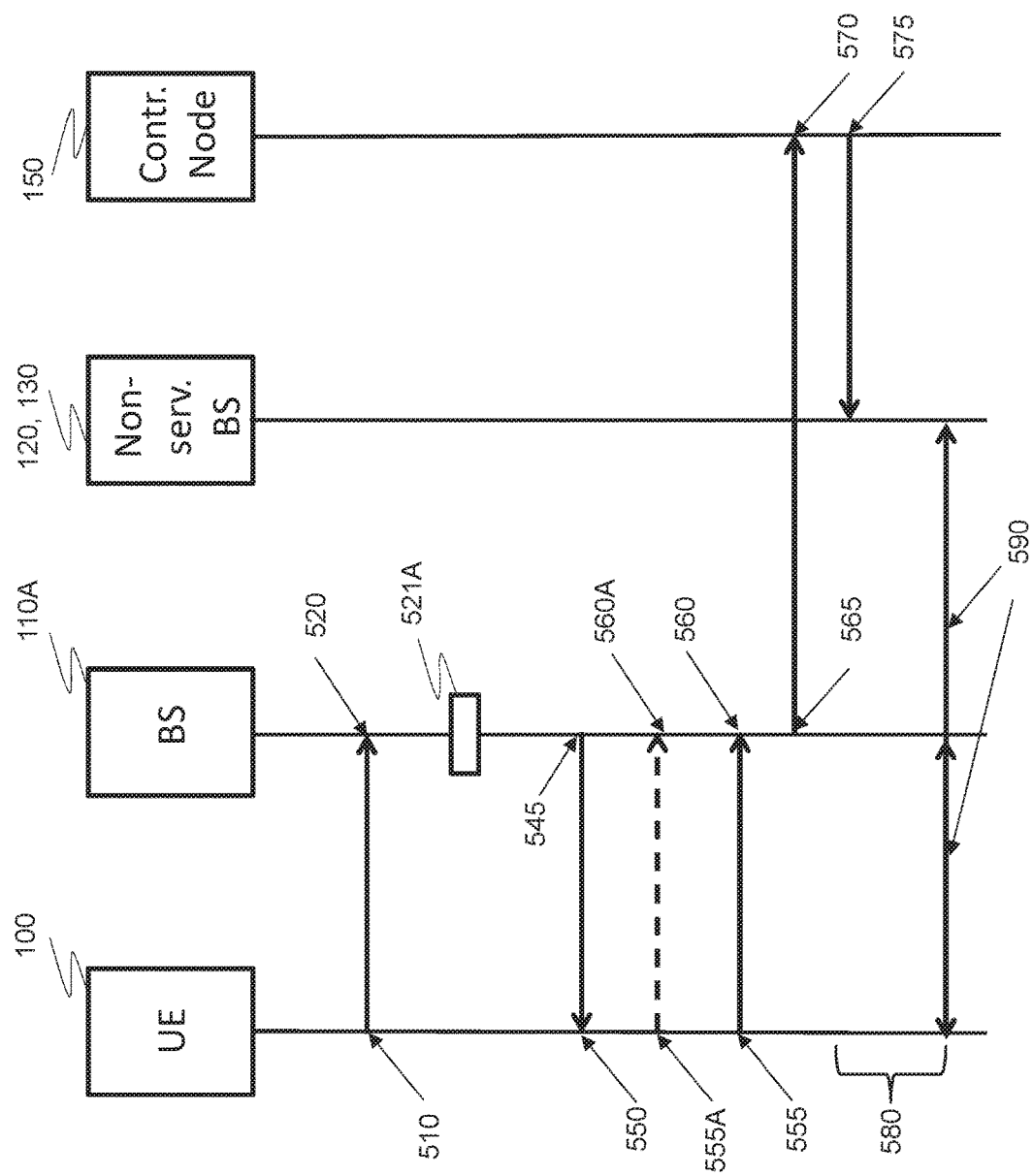
FIG. 3 is a signaling diagram illustrating an embodiment of method steps.

FIG. 3 is a signaling diagram illustrating an embodiment of method steps.

FIG. 3 presents the signaling between the UE 100, the serving BS 110A, the non-serving BS 120, 130 and the Control Node 150. FIG. 2 represents an embodiment wherein the serving BS 110A decides on a TTI switch.

It is to be understood that a number of network parameters, such as applicable value lengths, an applicable number of TTIs after which a switching of the actual TTI length value to a different length than the actual length, has to occur, are exchanged in an initial stage between UE 100, BS 110A, 120, 130 and optionally the Control Node, such that an indicator can be applied in messages, referring to the predetermined exchanged parameter. As an example the short TTI and long TTI length are already exchanged as 2 ms and 10 ms and stored in UE 100 and BSs 110A, 120, 130.

The UE 100, transmits 510 a report comprising a measured received power by the UE 100. This report is e.g a filtered Uplink Power Headroom, UPH, 18 bit Protocol Data Unit (PDU) message. The report is transmitted periodically, when the UE is triggered by changing radio environment conditions or when the serving BS requests for a report.

The serving BS 110A, receives 520 the report and evaluates 521A the report.

the TTI switching decision is based in an evaluation of a Media Access Control Uplink Power Headroom, MAC UPH, report transmitted by the UE. The values of the short TTI 12 ms and the long TTI 10 ms TTI length are preconfigured in the UE and the BS.

The UE sends an 18-bit UPH report to the serving BS when triggering criteria are met or periodically.

Both the UE and the BS will switch to a different TTI length, a predefined number of TTIs after the completion of the synchronized reconfiguration.

The serving BS 110A decides, based on the evaluation, to order the UE 100 to initialize a switching of an actual TTI length value to a different TTI length value, by transmitting 545 a switching message to the UE 100. The switching message 545 is a message such as a High Speed—Shared Control Channel HS-SCCH message.

The synchronized reconfiguration of BS and UE, is achieved by using a High Speed Shared Control Channel, HS-SCCH order message, followed by a L1 acknowledge, ACK in response to the HS-SCCH order message.

The switching message comprising a first identifier identifying the different TTI length value. The TTI switch is, depending on the actual TTI length a switch to another TTI length. In case there are only two TTI lengths are predefined, a toggle between both is applicable. In case more than two TTI lengths are predefined the first identifier identifies which one TTI length. As an example, 2 ms and 10 ms TTI length are listed although as an example a range of values such as 0.1, 0.2, 0.4, 0.5, 0.8, 1, 1.2, 1.5 ms for the short TTI and 1, 2, 4, 6, 8, 10 ms for the long TTI are applicable as long as there is a difference between both TTIs.

The BS 110A is, apart from deciding whether a TTI switch has to occur, also decisive in the number of TTI which has to be deployed after when a TTI switch occurs. E.g. the actual radio environment conditions influence the selected TTI number value.

The UE 100 transmits 555 a single reply message in response to receiving 550 the switching message, for acknowledging reception of the switching message and initializing a synchronized switching to the different TTI length value identified by the first identifier. The single reply message is a TTI switch commit message e.g. a High Speed—Dedicated Physical Control Channel (HS-DPCCH) message, as an 18 bit Protocol Data Unit (PDU) message.

The serving BS 110, forwards 565 the single reply message to the Control Node 150, as to enable other BSs, e.g. the non-serving BS 120, 130, to also be aware that the TTI for UE 100 has changed. The single reply message sent by the serving BS 110A is a TTI length update message.

The Control Node 150 receives 570 the single reply message and in response transmits 575 a second message to non-serving Base Stations 120, 130 for synchronized switching to the different TTI length value identified by the first identifier, the second message additionally comprising a second identifier identifying a number of TTIs after which a switching of the actual TTI length value to the different TTI length has to occur. The single reply message comprises also the indicator indicating the different TTI length value, such that when the transmission from the serving BS 110A via the Control Node 150 towards the non-serving BSs 120, 130, takes longer than the TTI switching procedure, due to network latency, are still aware of the different TTI length value of the UE 100. The second message transmitted 575 by the Control node is a TTI length update message.

The UE 100 holds 580 transmission of messages for a number of TTIs equal to the number of TTIs identified by the second identifier and the serving BS 110A receiving 560 the single reply message holds transmission of messages in relation to the UE 100 for a number of TTIs equal or in relation to the number of His identified by the second identifier.

The UE 100 and the serving BS 110A commence 590 transmissions of messages deploying the different TTI length value.

Depending on the configuration of the serving BS 110A and UE 100, the number of TTIs identified by the second identifier is decreased by e.g. a configurable fixed value of 1, 2 or 3 as to enable the serving BS 110A to synchronize the TTI switch initialised by the UE 100, between the UE 100 and the serving BS 110A.

Optionally the UE 100 transmits a reply Acknowledge message 555A in response to receiving 550 of the switching order message, replacing the acknowledgement in the single reply message. The serving BS 110A receives 560A the Acknowledge and starts waiting for the single reply message 560 as to initiate the TTI switching.

It is applicable to both FIGS. 2 and 3 that the UE 100 does not send Hybrid Automatic Report Requests Acknowledgement (HARQ-ACK) messages in response to the HS-SCCH order message, as it saves UE's battery power as well as reduces interference to other UEs. In addition, once the BS 110, 110A sends an order message 245, 545 to switch the TTI either on a primary or secondary carrier, the BS 110, 110A can switch off the receiver when decoding the High Speed—Dedicated Physical Control Channel (HS-DPCCH) message in response to this order message (1st slot).

Also with respect to both FIGS. 2 and 3, when the UE 100 is configured with multiple carriers in the downlink transmission and if at least two carriers are activated, then sending the HS-SCCH order message 245, 545 from the secondary carrier to inform about the TTI switching has a benefit on the system throughput for downlink.

If e.g. the primary carrier is loaded (general case) and sending an HS-SCCH order message requires certain amount of power (10% of total BS 110, 110A power) and the channelization code. In this way, power is reduced.

In general secondary carriers are not that loaded. It is proposed to send an HS-SCCH order message via the secondary carrier to the UE 100 to inform about the TTI switch In case of a potential Soft Handover, i.e. a UE in idle mode changing a serving cell, in order to ensure that both serving and non-serving BSs perform a TTI switch simultaneously, the UE sends a L1 or MAC indication after receiving the HS-SCCH order before the actual switch. Alternatively, the serving BS informs the Control Node of the TTI length update and the Control Node forwards the information to all the BSs in order to guarantee the alignment among serving and non-serving BS, FIG. 4 is a block diagram illustrating an embodiment of a device.

Figure 4:
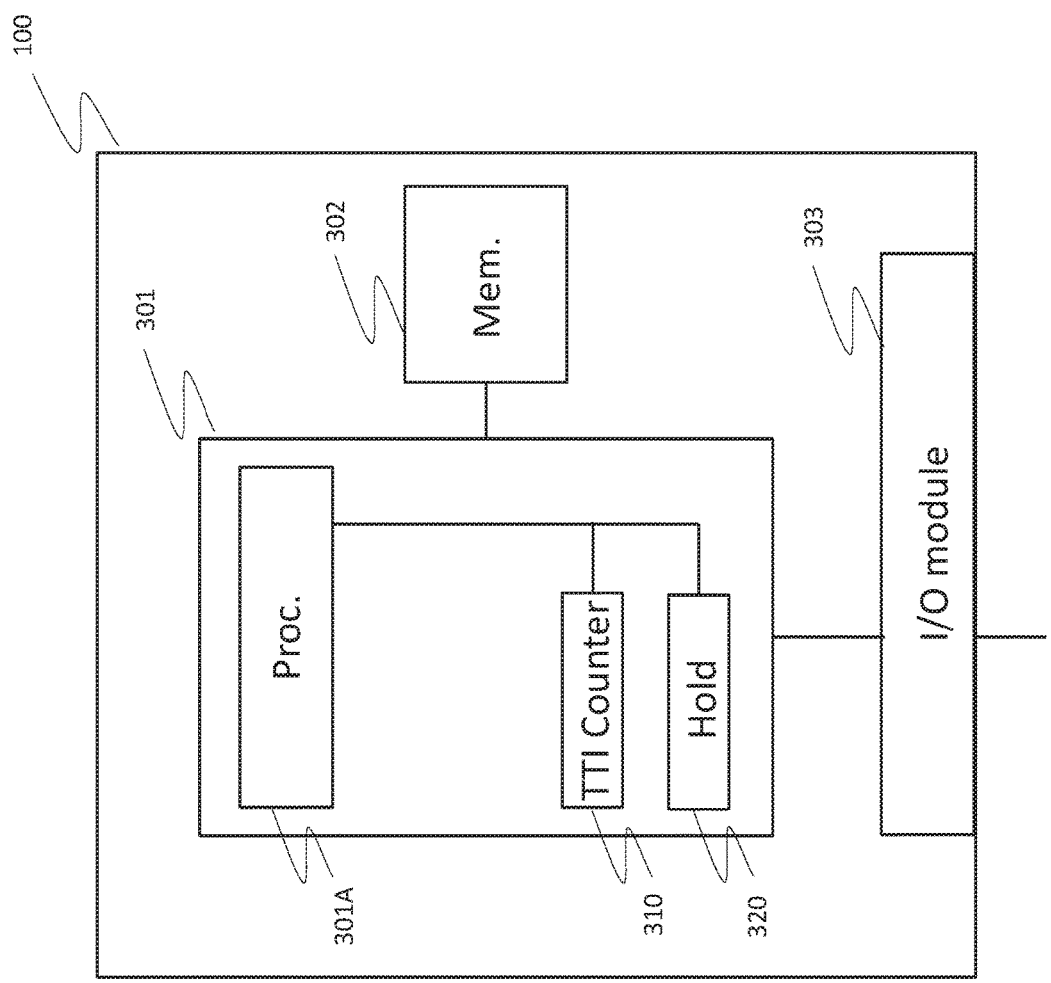
FIG. 4 is a block diagram illustrating an embodiment of a device.

FIG. 4 is a block diagram illustrating an embodiment of a UE 100 arranged for synchronized switching of a Transmission Time Interval, TTI, between at least two different TTI length values. The UE is arranged to deploy an actual- and a different-TTI length value.

The UE 100 comprises:
- a processing unit 301 arranged to process program instructions;
- a memory 302 arranged to store the program instructions and network parameters;
- an interface, I/O module 303 arranged to connect to other entities.

The processing unit 301, comprises a processor 301A arranged to execute functional modules TTI counter 310 and Hold module 320.

The processing unit 301 is further arranged, under the program instructions, to control the interface 303, in that a switching message comprising a first identifier identifying the different TTI length value is received 250, 550 and stored in the memory 302.

The processing unit 301 is further arranged, under the program instructions to compile a single reply message in response to the switching message, as to acknowledge reception of the switching message and as to initialize a synchronized switching to the different TTI length value identified by the first identifier.

The processing unit 301 is further arranged, under the program instructions to control the interface 303 to transmit the compiled single reply message.

The Interface 303 is further arranged to connect to input devices (not shown), such as a keyboard, touchscreen, microphone, and output devices (not shown) such as a screen or speaker. The interface 303 is further arranged to maintain a wireless connection to e.g. a serving BS 110 in a communications network.

The processing unit 301 of UE 100 is further arranged, under the program instructions, to control the interface 303, in that the switching message additionally comprises a second identifier identifying a number of TTIs after which a switching of a current TTI length value to the different TTI length value has to occur, is received, and wherein the processing unit 301 is further arranged under the program instructions to control the interface 303 with holding transmission of messages for a number of TTIs equal to the number of TTIs identified by the second identifier and, commencing transmission of messages deploying the different TTI length value.

The processor 301A of UE 100 is arranged under the program instructions to control a TTI counter 310 that counts the number of TTIs equal to the number of TTIs identified by the second identifier. The processor is further arranged to control a hold transmission module 320 to hold transmission of messages via I/O module 303 during counting of the counter module 310.

The processing unit 301 of UE 100 is further arranged under the program instructions to control the interface 303 to transmit an acknowledgement 255A, 555A in response to the reception 250, 550 of the switching message, intended for replacing the acknowledgement in the single reply message.

Figure 5:
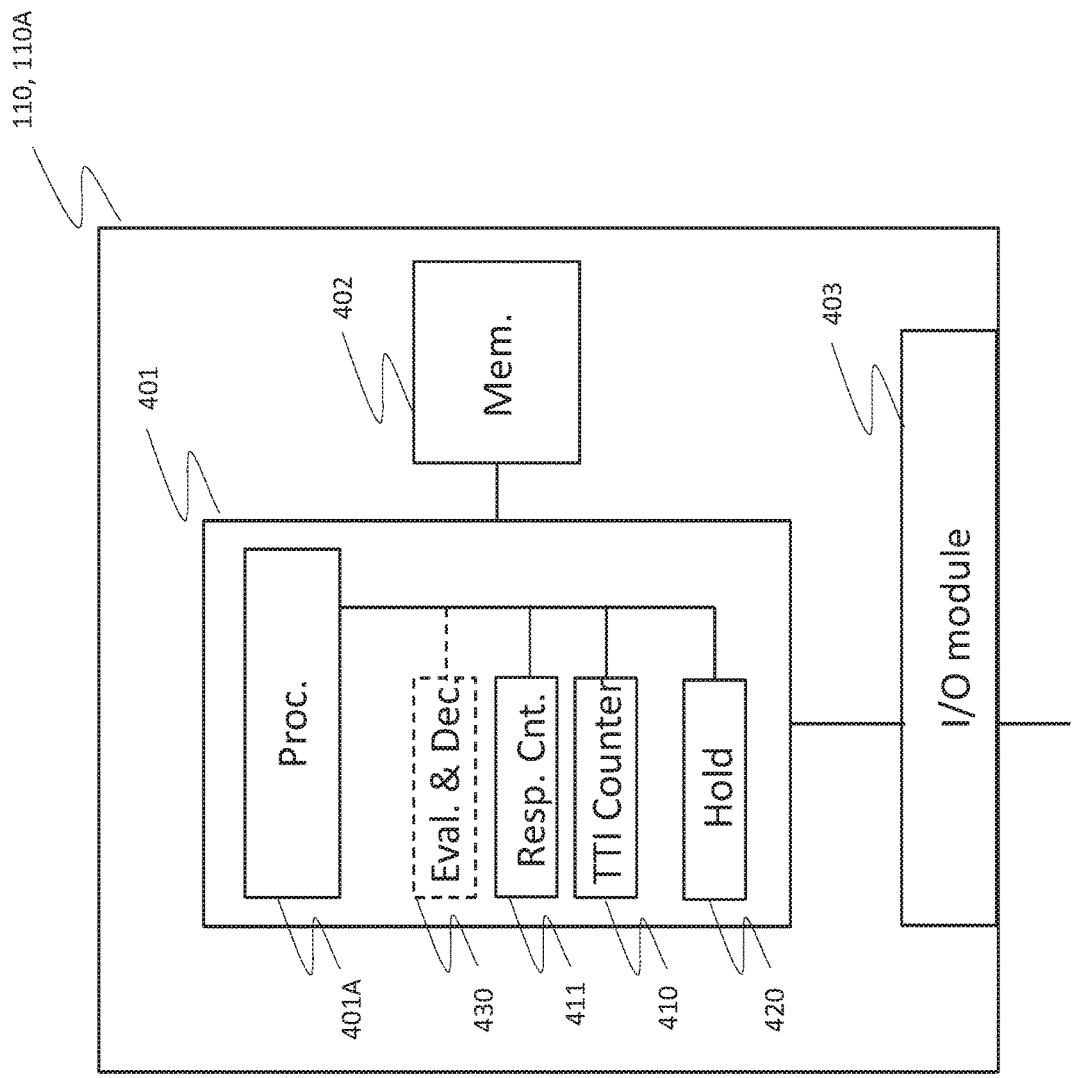
FIG. 5 is a block diagram illustrating an embodiment of a device.

FIG. 5 is a block diagram illustrating an embodiment of a device.

FIG. 5 is a block diagram illustrating an embodiment of a BS 100, 100A arranged for synchronized switching of a Transmission Time Interval, TTI, between at least two different TTI length values. The BS is arranged to deploy an actual- and a different-TTI length value.

The BS 110, 110A comprises:
a processing unit 401 arranged to process program instructions;
a memory 402 arranged to store the program instructions and network parameters;
an interface, I/O module 403 arranged to connect to other entities.

The processing unit 401 is further arranged, under the program instructions, to control the interface 403, in that a report message is received 220, 520, the report message comprising a report comprising a measured received power by a User Equipment, UE 100 and The processing unit 401 further arranged, under the program instructions, to control the interface 403, in that a switching message, in response to the report message, is transmitted 245. The switching message comprises a first identifier identifying the different TTI length value.

the processing unit 401 is further arranged, under the program instructions, to control the interface 403, in that a single reply message is received 260 and forwarded 265, the single reply message interpreted by the processing unit 401 as an acknowledge to the switching message transmission 245 and the single reply message is interpreted by the processing unit 401 as an initiation to hold transmissions with respect to the UE 100.

The processing unit 401 of the BS 110, 110A is further arranged, under the program instructions to control the interface 403 to receive 420 the switching message wherein the switching message additionally comprises a second identifier identifying a number of TTIs after which a switching of the actual TTI length value to the different TTI length has to occur, and wherein the processing unit 401 is further arranged, under the program instructions, to control the interface 403 that after reception 260, 560 of the single reply message, transmission of messages in relation to the UE 100 is hold for a number of TTIs equal or in relation to the number of TTIs identified by the second identifier.

The processor 401A of the BS 110, 110A is arranged, under the program instructions to start a response counter 411 after transmission of the switching message 245, 545 and to send the switching message again when a predetermined value is reached by the response counter 411.

The processing unit 401 of the BS 110, 110A is further arranged under the program instructions to control the interface 403 to receive an acknowledgement 260A, 560A in response to the transmission 245, 545 of the switching message, replacing the acknowledgement in the single reply message.

the processor 401A of the BS 110A further arranged, under the program instructions, to evaluate 521A the received 520 report and deciding, based on the evaluation, to order the UE 100 to initialize a switching of an actual TTI length value to a different TTI length value, and transmit 545 a switching message wherein the switching message comprising a first identifier identifying the different TTI length value.

It is proposed to apply the switching message 245, 545 as an order message such as the HS-SCCH order message to inform the UE to perform the TTI switch (2 ms to 10 ms or 10 ms to 2 ms).

If the order message is transmitted from the serving High Speed Downlink Shared Channel (HS-DSCH) cell or a secondary serving HS-DSCH cell, for this Order type, the meaning of the order message is proposed as listed in the Table X.X below. The Order Mapping valued identifiers Xord,1, Xord,2, Xord,3, have example values in the table X.X. below and should be predefined and in combination identify a particular switch from 2 ms TTI to 10 ms TTI or vice versa.

TABLE X.X

Orders to inform the UE to perform the TTI switch

| Extended Order Type $X_{eodt,1}$, $X_{eodt,2}$ | Order Type $X_{odt,1}$, $X_{odt,2}$, $X_{odt,3}$ | Order Mapping $X_{ord,1}$ $X_{ord,2}$ $X_{ord,3}$ | TTI switch A = TTI switch from 2 ms to 10 ms order; B = TTI switch from 10 ms to 2 ms order |
|---|---|---|---|
| 11 | 011 | 1 1 1 | A |
|  |  | 0 0 0 | B |
|  |  | 0 0 1 | Unused (Reserved) |
|  |  | 0 1 0 | Unused (Reserved) |
|  |  | 0 1 1 | Unused (Reserved) |
|  |  | 1 0 0 | Unused (Reserved) |
|  |  | 1 0 1 | Unused (Reserved) |
|  |  | 1 1 0 | Unused (Reserved) |

In general, the Control Node 150, or the BS 110A configures the value 'N', where N is the number of TTIs after which the UE 100 should switch.

In a further example embodiment, it is proposed that the BS 100, 110A can set (change) the value of N and indicate this in the HS-SCCH order message 245, 545.

In the example below, N is indicated by N1, N2, N3 and N4. Thereby the HS-SCCH order message indicates the value of N as shown in Table below Depending on the configuration of the serving BS 110, 110A and UE 100, the number of TTIs identified by the second identifier is decreased by e.g. a configurable fixed value for N of 0, 1, 2 or 3, representing N1, N2, N3 or N4 respectively, as to enable the serving BS 110 to synchronize the TTI switch initialised by the UE 100, between the UE 100 and the serving BS 110.

It is proposed to further adapt table X.X into table Y.Y as shown below as to deploy the idea of synchronized TTI switching as presented.

TABLE Y.Y

Orders to inform the UE to perform the TTI switch

| Extended Order Type $X_{eodt,1}$, $X_{eodt,2}$ | Order Type $X_{odt,1}$, $X_{odt,2}$, $X_{odt,3}$ | Order Mapping $X_{ord,1}$ $X_{ord,2}$ $X_{ord,3}$ | TTI switch A = TTI switch from 2 ms to 10 ms order; B = TTI switch from 10 ms to 2 ms order |
|---|---|---|---|
| 11 | 011 | 1  1  1 | A with N = N1 |
|    |     | 0  0  0 | B with N = N1 |
|    |     | 0  0  1 | A with N = N2 |
|    |     | 0  1  0 | B with N = N2 |
|    |     | 0  1  1 | A with N = N3 |
|    |     | 1  0  0 | B with N = N3 |
|    |     | 1  0  1 | A with N = N4 |
|    |     | 1  1  0 | B with N = N4 |

The method and devices presented advantageously provide an efficient TTI switching process where the UE 100 does not need to send an Acknowledge to the BS 110, 110A, because the UE 100 will send the TTI switch commit (18 bit PDU) 255, 555 to the serving BS 110, 110A, thereby achieving the required synchronization and preserving an acknowledgement message, resulting into saving UE battery power, and interference with other transmissions.

The method and devices presented advantageously provide the possibility, when the UE 100 is configured with multiple carriers in the downlink, and the if at least 2 carriers are activated, to send the HS-SCCH 245, 545 switching order message from the secondary carrier in order to inform about the TTI switching thereby increasing the chance on a successful TTI switch.

The method and devices presented advantageously provide the BS 110, 110A may go into Discontinuous Reception (DRX) after sending the HS-SCCH 245, 545 switching order message, for the HARQ-ACK for this order, thereby saving power.

The suggested process enables the switch to the long TTI as late as possible in order to retain the advantage of the short TTI (e.g. for high data rates) and to avoid back-and-forth reconfigurations An efficient short TTI 2 ms to long 10 ms TTI switch is directly related to the accuracy of the coverage measurement and to the speed and robustness of the switching procedure. In case of non-optimal measurement triggers and slow switching procedures, some conservative safety margins would have to be taken into account (e.g. a long activation time for the switching procedure, leading to an early switch), resulting in further loss of short TTI 2 ms coverage.

The use of a second identifier has the advantage that the activation time is set to prevent that when the activation time is not sufficiently long, it might lead to the situation in which the BS and the UE do not switch at the same time, remaining misaligned for one or more Connection Frame Number (CFN) cycles.

The invention claimed is:

1. A method in a User Equipment (UE) for synchronized switching of a Transmission Time Interval (TTI) between at least two different TTI lengths, the method comprising:
   transmitting a report comprising a measured received power;
   receiving a switching message indicating that the UE is to switch from using TTIs having a first length to using TTIs having a second length, wherein the switching message indicates a number of TTIs after which a switching of a current TTI length value to the different TTI length value is to occur; and,
   in response to said switching message, switching from using TTIs having the first length to using TTIs having the second length, in accordance with the indicated number of TTIs.

2. The method of claim 1, wherein the UE is configured with multiple carriers in the downlink transmission and wherein at least two carriers, a primary and a secondary carrier, are activated, and wherein the switching message is received by the UE via the secondary carrier.

3. The method of claim 1, wherein the switching message sent by a serving High Speed Downlink Shared Channel (HS-DSCH) cell or a secondary serving HS-DSCH cell, comprises a predetermined order mapping indicator indicating an order for switching a short TTI length to a long TTI length or vice versa.

4. The method of claim 1, wherein the method further comprises starting a counter counting TTIs, the value of the counter indicating when transmission with the second TTI length commences.

5. A method in a Base Station (BS) for synchronized switching of a Transmission Time Interval (TTI) between at least two different TTI length values, the method comprising:
   receiving, from a User Equipment (UE), a report comprising a measured received power; and
   evaluating the report and deciding, based on the evaluation, to order the UE to initialize a switching from a first TTI length to a second TTI length, by transmitting a switching message indicating that the UE is to switch from using TTIs having the first length to using TTIs having the second length, wherein the switching message indicates a number of TTIs after which a switching of a current TTI length value to the different TTI length value is to occur.

6. The method of claim 5, wherein the method further comprises:
   switching, for communications with the UE, from using TTIs having the first length to using TTIs having the second length.

7. The method of claim 5, wherein the UE is configured with multiple carriers in the downlink transmission and wherein at least two carriers, a primary and a secondary carrier, are activated, and wherein the switching message is sent by the BS via the secondary carrier.

8. The method of claim 5, wherein the switching message, sent by a serving High Speed Downlink Shared Channel (HS-DSCH) cell or a secondary serving HS-DSCH cell, comprises a predetermined order mapping indicator indicating an order for switching a short TTI length to long TTI length or vice versa.

9. A User Equipment (UE) for synchronized switching of a Transmission Time Interval (TTI) between at least two different TTI length values, the UE being configured to deploy an actual- and a different- TTI length value, the UE comprising:
   a processing circuit comprising a processor configured to process program instructions and a memory arranged to store the program instructions and network parameters; and
   an interface circuit configured to communicate with a base station (BS);
   wherein the processing circuit is configured to:
   control the interface circuit to transmit a report comprising a measured received power;
   receive, via the interface circuit, a switching message indicating that the UE is to switch from using TTIs having a first length to using TTIs having a second length, wherein the switching message indicates a number of TTIs after which a switching of a current TTI length value to the different TTI length value is to occur; and,
   in response to said switching message, switch from using TTIs having the first length to using TTIs having the second length, in accordance with the indicated number of TTIs.

10. The UE of claim 9, wherein the processing circuit is configured to receive the switching message via the secondary carrier when the UE is configured with multiple carriers in the downlink transmission and when at least two carriers, a primary carrier and the secondary carrier, are activated.

11. The UE of claim 9, wherein the switching message sent by a serving High Speed Downlink Shared Channel (HS-DSCH) cell or a secondary serving HS-DSCH cell, comprises a predetermined order mapping indicator indicating an order for switching a short TTI length to a long TTI length or vice versa.

12. The UE of claim 9, wherein the processing circuit is further configured to start a counter counting TTIs, the value of the counter indicating when transmission with the second TTI length commences.

13. A Base Station (BS) for synchronized switching of a Transmission Time Interval (TTI) between at least two different TTI length values, the BS comprising:
   a processing circuit comprising a processor configured to process program instructions and a memory configured to store the program instructions and network parameters; and
   an interface circuit configured to communicate with one or more User Equipments (UEs);
   wherein the processing circuit is configured to:
   receive a report message from a UE, the report message comprising a measured received power;
   evaluate the report and decide, based on the evaluation, to order the UE to initialize a switching of an actual TTI length value to a different TTI length value, by transmitting a switching message indicating that the UE is to switch from using TTIs having the first length to using TTIs having the second length, wherein the switching message indicates a number of TTIs after which a switching of a current TTI length value to the different TTI length value is to occur.

14. The BS of claim 13, wherein the processing circuit is further configured to:
   switch, for communications with the UE, from using TTIs having the first length to using TTIs having the second length.

15. The BS of claim 13, wherein the processing circuit is configured to send the switching message via a secondary carrier, when the UE is configured with multiple carriers in the downlink transmission and at least two carriers, a primary carrier and the secondary carrier, are activated.

16. The BS of claim 13, wherein the switching message, sent by a serving High Speed Downlink Shared Channel (HS-DSCH) cell or a secondary serving HS-DSCH cell, comprises a predetermined order mapping indicator indicating an order for switching a short TTI length to long TTI length or vice versa.

* * * * *